(12) United States Patent
Roe (10) Patent No.: US 8,087,199 B2
(45) Date of Patent: Jan. 3, 2012

(54) PARTIAL-BODY LARGE GAME DECOY

(76) Inventor: Garrett W. Roe, Hays, KS (US)

( * ) Notice: Subject to any disclaimer, the term of this patent is extended or adjusted under 35 U.S.C. 154(b) by 35 days.

(21) Appl. No.: 12/550,720

(22) Filed: Aug. 31, 2009

(65) Prior Publication Data

US 2010/0175301 A1    Jul. 15, 2010

Related U.S. Application Data (60) Provisional application No. 61/143,913, filed on Jan. 12, 2009.

(51) Int. Cl.
*A01M 31/06*    (2006.01)
(52) U.S. Cl. ...................................... 43/2; 43/3
(58) Field of Classification Search .............. 43/2, 3
See application file for complete search history.

(56) References Cited

U.S. PATENT DOCUMENTS

| | | | | |
|---|---|---|---|---|
| 695,903 | A * | 3/1902 | Braatz | 472/84 |
| 833,966 | A * | 10/1906 | Johnston | 43/3 |
| 2,812,608 | A * | 11/1957 | Jones | 43/3 |
| 5,231,780 | A * | 8/1993 | Gazalski | 43/3 |
| 5,279,063 | A * | 1/1994 | Heiges | 43/3 |
| 5,522,168 | A * | 6/1996 | Friddle | 43/1 |
| 5,572,823 | A * | 11/1996 | Savaria | 43/2 |
| 5,595,012 | A * | 1/1997 | Coleman | 43/3 |
| 5,943,807 | A * | 8/1999 | McPherson | 43/2 |
| 6,070,356 | A * | 6/2000 | Brint et al. | 43/2 |
| 6,349,902 | B1 * | 2/2002 | Cripe | 244/153 R |
| 6,374,530 | B1 * | 4/2002 | Mierau | 43/3 |
| 6,385,895 | B1 * | 5/2002 | Scaries | 43/2 |
| 6,519,891 | B2 * | 2/2003 | Fulcher | 43/2 |
| 6,647,657 | B2 * | 11/2003 | Igo | 43/3 |
| 7,481,017 | B1 * | 1/2009 | Bocchi | 43/3 |
| 7,827,728 | B1 * | 11/2010 | Spafford et al. | 43/2 |
| 2007/0006514 | A1 * | 1/2007 | Fiore et al. | 43/2 |
| 2007/0180753 | A1 * | 8/2007 | Zink et al. | 43/3 |
| 2009/0249678 | A1 * | 10/2009 | Arnold | 43/2 |
| 2011/0010982 | A1 * | 1/2011 | Poorman | 43/2 |

* cited by examiner

*Primary Examiner* — Darren W Ark
*Assistant Examiner* — Lisa Tsang
(74) *Attorney, Agent, or Firm* — Hovey Williams LLP (57) ABSTRACT

A partial-body large game decoy shiftable between a disassembled configuration and an assembled configuration. The decoy may comprise an internal support system, an elongated handle configured for selective attachment to the internal support system, and a cover having a likeness of a large game animal therein or thereon. The cover may have the internal support system disposed therein for providing a desired shape to the cover depicting head, neck, and/or shoulders of a large game animal. A user may hold the decoy by the handle from behind a visual obstacle such that the decoy appears to be a large game animal with its body and legs hidden behind the visual obstacle. In the disassembled configuration, the internal support system may be at least partially disassembled such that the cover may be folded up into a more compact configuration for transport or storage by the hunter.

21 Claims, 10 Drawing Sheets

PARTIAL-BODY LARGE GAME DECOY

RELATED APPLICATIONS

This nonprovisional patent application claims priority benefit, with regard to all common subject matter, of earlier-filed U.S. provisional patent application titled "Partial-Body Large Game Decoy", Ser. No. 61/143,913, filed Jan. 12, 2009, hereby incorporated by reference in its entirety into the present application.

BACKGROUND

1. Field

Embodiments of the present invention relate to hunting. More particularly, embodiments of the present invention relate to a large game hunting decoy.

2. Related Art

Large game decoys are used by hunters to attract large animals to a particular location within shooting range of the hunter. These large game decoys can be bulky and require numerous supportive devices to keep them rigid. Additionally, large game decoys generally require a predetermined destination of use and can not be quickly and easily repositioned because they must be staked to the ground for support in an upright position. Furthermore, large animals can be unpredictable in their movements and often inhabit places difficult to reach and difficult to position traditional large game decoys. Large game decoys are also motionless, making it difficult for them to catch the attention of large animals.

SUMMARY

Embodiments of the present invention solve the above-mentioned problems and provide a distinct advance in the art of large game hunting decoys. More particularly, embodiments of the invention provide a partial-body large game decoy that is shiftable between a disassembled configuration and an assembled configuration, said decoy comprising: an internal support system, an elongated handle attached to the internal support system, and a cover positioned over the internal support system.

The internal support system may include a flexible elongated primary tubular member, one or more feature support members coupled to and extending outwardly from the primary tubular member, a handle attachment structure coupled to the tubular member, and a releasable fastener for selectively coupling substantially opposite ends of the primary tubular member to one another.

The elongated handle may have an attachment end and a gripping end. The attachment end may be configured for selective attachment to the handle attachment structure of the internal support system. The gripping end may be held in a human hand or attached to a tree clamp for mounting the decoy onto a tree. The cover may be a pocket formed in a cloth or cloth-like material having the partial likeness of a large game animal (e.g. dear, elk, or antelope) therein or thereon, including a painted or printed image of the large game animal's head, neck, and/or shoulders on one or both sides of the cover.

The components of the decoy may be placed in an assembled configuration or a disassembled configuration. When the decoy is in the assembled configuration, the primary tubular member may be formed into a single loop with its opposite ends coupled to one another. Additionally, the internal support system may be received in the cover and may support the cover generally in the shape of the large game animal being depicted. In the assembled configuration, the handle may also be coupled to the internal support system and may extend external to the cover.

When the decoy is in the disassembled configuration, the ends of the primary tubular member may be decoupled from one another such that the primary tubular member is not formed into a single loop, and the handle may be decoupled from the internal support system. Furthermore, in the disassembled configuration, the ends may be urged further into the cover such that a portion of the cover may be folded or rolled up. In some embodiments of the disassembled configuration, the internal support system may be completely removed out of the cover.

In use, a hunter may reconfigure the decoy from the disassembled configuration to the assembled configuration and may hold the handle of the decoy from behind an obstruction so that only the cover of the decoy is viewed by large game animals. Furthermore, the user may manually move the decoy to simulate natural movement of the large game animal depicted by the decoy. Alternatively, the handle may be attached to or integrated with various accessories such as a clamp or a bow mount.

This summary is provided to introduce a selection of concepts that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
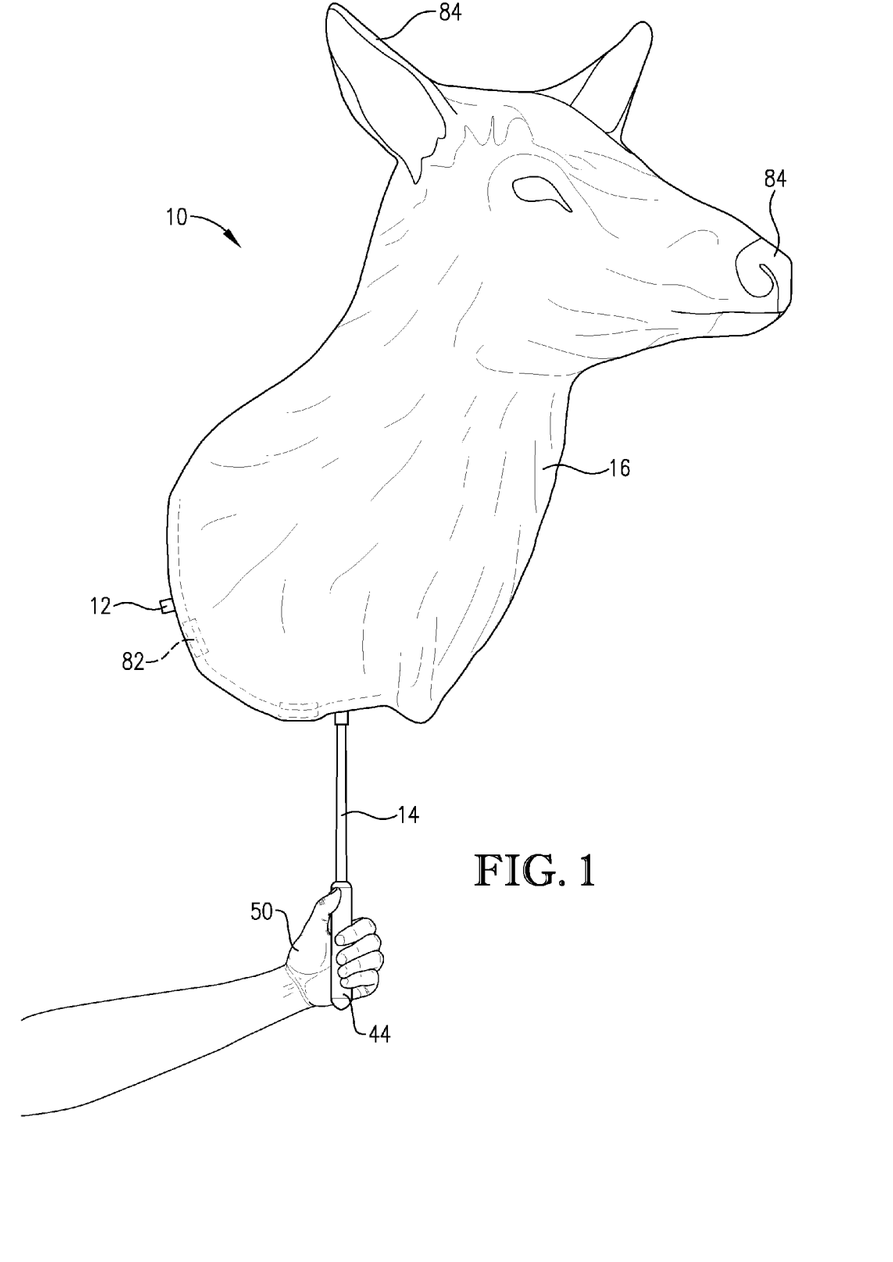
FIG. 1 is a perspective view of a hunting decoy constructed in accordance with an embodiment of the invention.

FIG. 1 illustrates a partial-body large game decoy 10 according to various embodiments of the present invention. The decoy 10 is shiftable between a disassembled configuration and an assembled configuration, and may comprise an internal support system 12, an elongated handle 14 configured for selective attachment to the internal support system 12, and a cover 16 having a likeness of a large game animal (e.g. deer, elk, or antelope) therein or thereon and having the internal support system 12 disposed therein for providing a desired shape to the cover 16.

Figure 2:
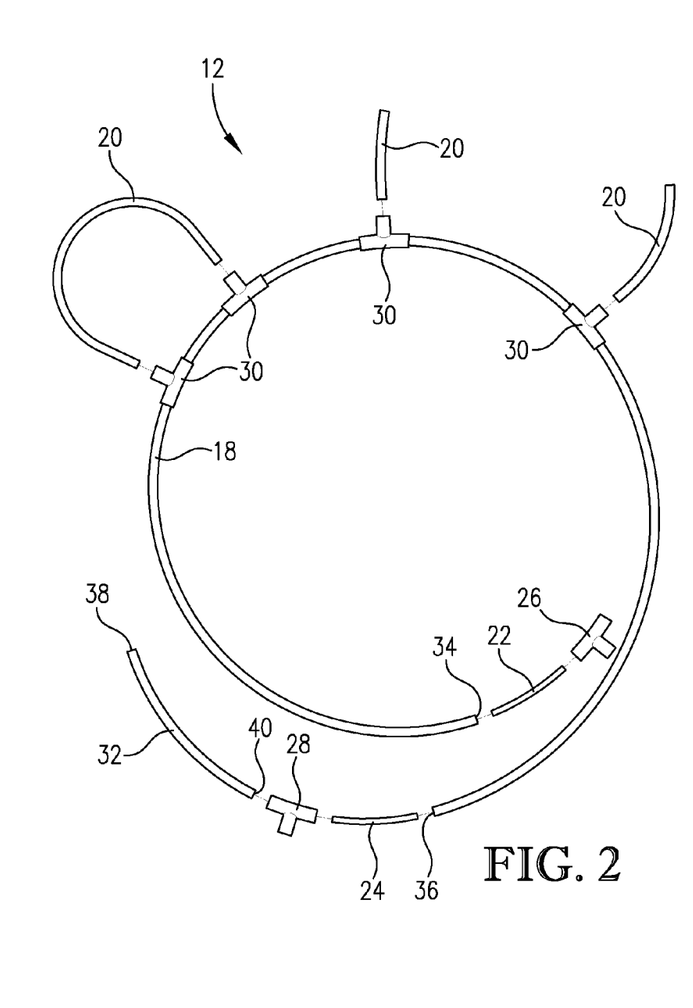
FIG. 2 is a perspective view of an internal support system of the decoy of FIG. 1 in a disassembled configuration.
Figure 3:
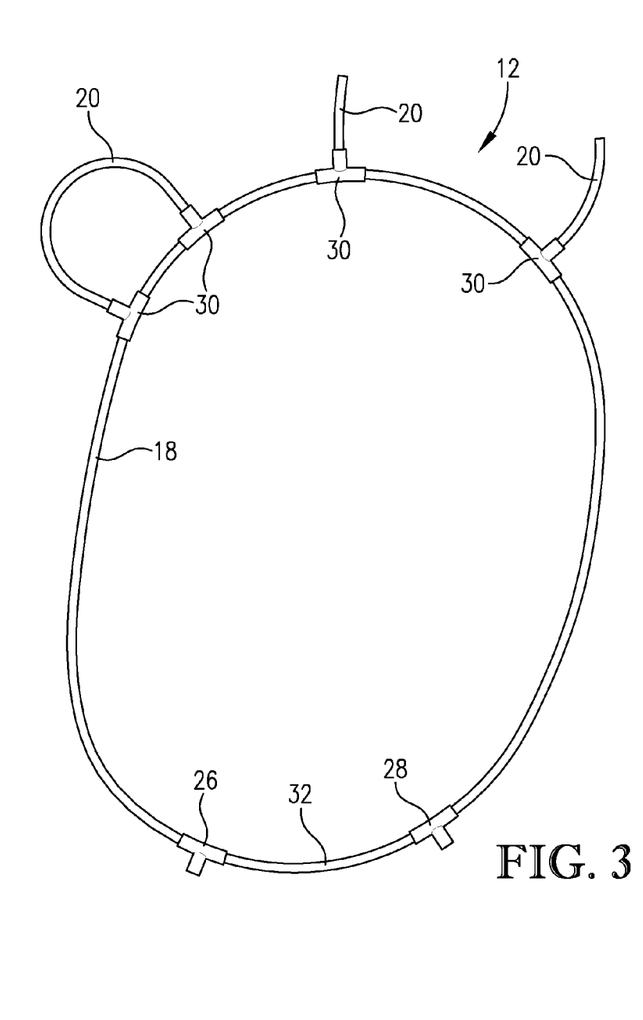
FIG. 3 is a perspective view of the internal support system of the decoy of FIG. 1 in an assembled configuration.

The internal support system 12, illustrated in FIGS. 2-3, may comprise a flexible, elongated primary tubular member 18, one or more feature support members 20 coupled to and extending outwardly from the primary tubular member 18, at least one handle attachment structure 22,24 coupled to the primary tubular member 18, and at least one releasable fastener 26,28 for connecting the primary tubular structure 18 into a loop. Furthermore, the internal support system 12 may comprise a plurality of tube connectors 30 for connecting the support members 20 to the primary tubular structure 18 and at least one spacer tube 32 for extending the length of the primary tubular member 18 and/or spacing at least one of the handle attachment structures 22,24, releasable fasteners 26,28, and tube connectors 30 at a desired distance apart from each other. However, please note that one or more of the elements of the internal support system 12 may be omitted without departing from the scope of the invention.

The primary tubular member 18 may be formed of plastic, thermoplastic, metal, or any substantially rigid, resilient material capable of flexure without permanently creasing or otherwise substantially changing the physical properties of the primary tubular member 18. The primary tubular member 18 may comprise an elongated rod or tube having opposing ends 34,36 and any cross-sectional shape. For example, the primary tubular member 18 may be a hollow tube with a circular cross-section, a square cross-section, an oval cross-section, or any cross-sectional shape, maintaining a substantially uniform shape and size throughout a length of the primary tubular member 18. Alternatively, in some embodiments of the invention, the primary tubular member 18 may not be hollow, but may rather be solid throughout its length and cross-section. The primary tubular member 18 may have a length, for example, between approximately 18 inches and 120 inches. The primary tubular member 18 may more specifically have a length between approximately 24 inches and 96 inches, or between approximately 30 inches and 72 inches.

The feature support members 20 may also comprise elongated tubes or rods formed of plastic, thermoplastic, metal, or any substantially rigid, resilient material capable of flexure without permanently creasing or otherwise substantially changing the physical properties. The feature support members 20 may be integral with the primary tubular member 18, or may be detachably and/or movably attached to the primary tubular member 18 to allow for various covers and various decoy configurations. The feature support members 20 may be shaped like ears, nose, and/or antlers or any other features of the animal being depicted by the decoy 10. In some embodiments of the invention, the feature support members 20 may be attached outward of and/or onto the cover 16. For example, one or more of the tube connectors 30 may be slid onto, threaded onto, or otherwise connected to the primary tubular structure 18 such that one end of one of the feature support members 20 may be attached thereto.

The handle attachment structure 22,24, as illustrated in FIG. 2, may be any attachment apparatus coupled to and/or integral with the primary tubular member 18 and operable to attach to the handle 14. In one embodiment, the handle attachment structure 22,24 may be a flexible rod or tube having a smaller diameter than the primary tubular member 18. The handle attachment structure 22,24 may extend through one or more openings of at least one of the primary tubular member 18 and the releasable fastener 26,28 and may be sized to couple with at least one end of the handle 14, as described below.

Furthermore, the handle attachment structure 22,24 may include a plurality of handle attachment structures. For example, as depicted in FIGS. 2-3, the handle attachment structure 22,24 may comprise a first attachment structure 22 and a second attachment structure 24 coupled to the primary tubular member 18 and spaced a distance apart from each other. Both the first and second attachment structures 22,24 may be configured for selectively receiving at least one end of the handle 14.

The releasable fastener 26,28 is configured for selectively coupling the ends 34,36 of the primary tubular member 18 to one another, creating a loop for providing structural support and shape to the cover 16. The releasable fastener 26,28 may be integral with one of the ends 34,36 or may be a separate apparatus detachable and attachable with each of the ends 34,36. The releasable fastener 26,28 may be any fastener, such as a snap fastener and/or a tubular, hollow, collar-like fastener with a plurality of openings for receiving at least one of the ends 34,36 and the handle 14.

The releasable fastener 26,28 may substantially surround and/or house the handle attachment structure 22,24 therein, such that when the handle 14 is inserted into the releasable fastener 26,28, the handle 14 couples with the handle attachment structure 22,24. The releasable fastener 26,28 may comprise a plurality of releasable fasteners. For example, the releasable fastener 26,28 may comprise a first releasable fastener 26 and a second releasable fastener 28 spaced a distance apart from each other.

In one embodiment of the invention, the tube connectors 30 may be collar-like tees having a hollow "T" shape, such that the primary tubular structure 18 may be slid through two opposing openings of the tube connector 30 and an end portion of one of the feature support members 20 may be slid in through a third opening of the tube connector 30, as illustrated in FIG. 3. Notches, interior threads, tension, and/or friction may hold the feature support member 20 within tube connector 30.

The spacer tube 32 may have a first spacer tube end 38 and an opposing second spacer tube end 40 and may extend between the first releasable fastener 26 and the second releasable fastener 28 to create the distance therebetween. In this configuration, end 34 and the spacer tube end 38 may be joined by the first releasable fastener 26 while end 36 and the spacer tube end 40 may be joined by the second releasable fastener 28. Additional spacer tubes may be used with additional releasable fasteners without departing from the scope of the invention to provide for additional configurations of the decoy 10. In alternative embodiments of the invention, the spacer tube 32 may be omitted and one of the releasable fasteners 26,28 may slide onto or be integral with the primary tubular member 18, such that the ends 34,36 may be coupled by the other of the releasable fasteners 26,28. This alternative embodiment allows for a plurality of releasable fasteners 26,28 and therefore a plurality of locations for attaching the handle 14 without requiring the spacer tube 32.

Figures 4, 5, 6:
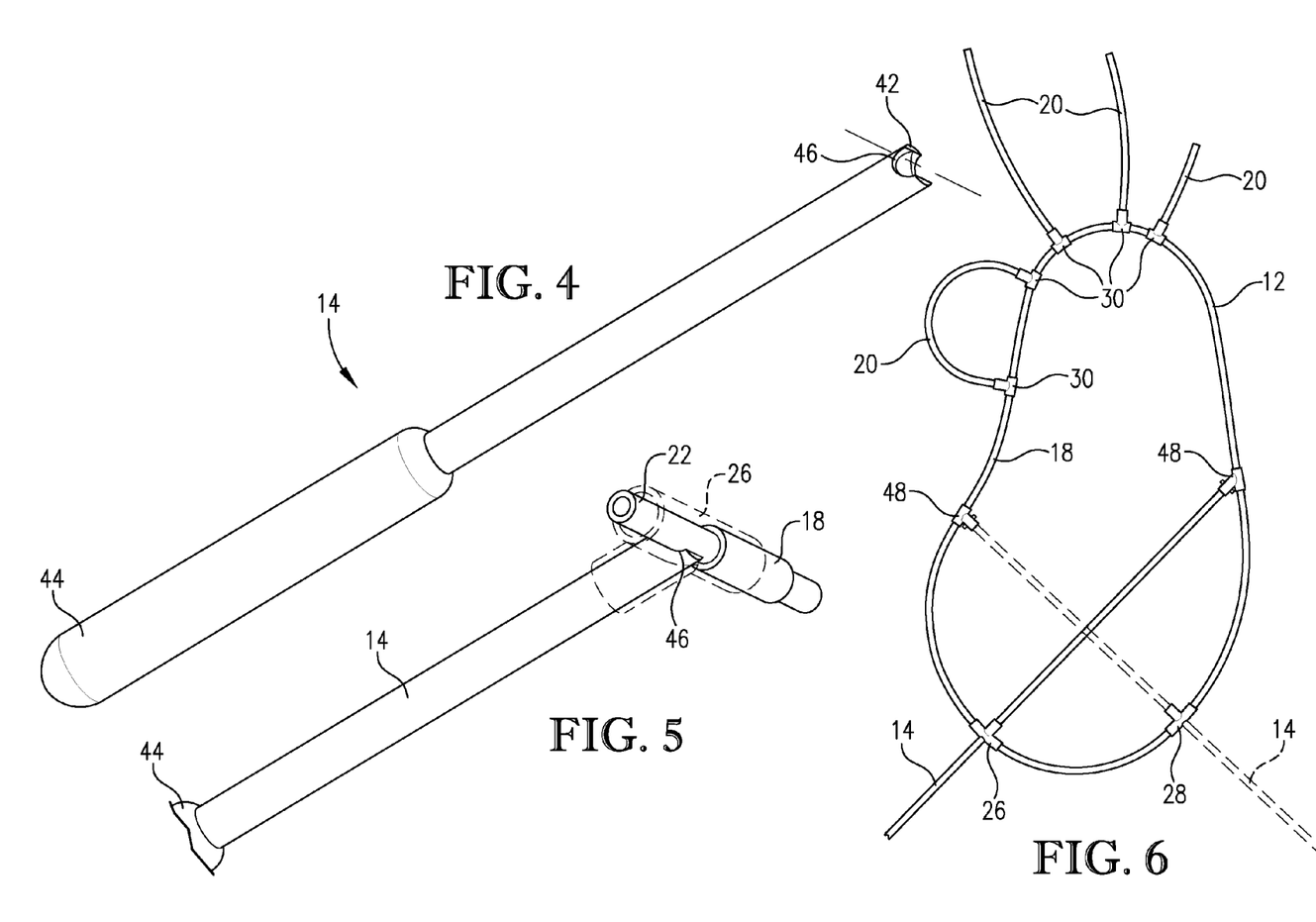
FIG. 4 is a perspective view of a handle of the decoy of FIG. 1.
FIG. 5 is a perspective view of the handle mating with the internal support system of FIG. 2.
FIG. 6 is a perspective view of the handle mating at two separate points on the internal support system of FIG. 2.

The elongated handle 14, as illustrated in FIGS. 4-5, may be made of epoxy resin, plastic, metal, or any substantially rigid material for supporting the decoy 10 and may comprise an attachment end 42 and a gripping end 44. The length of the handle 14 may be, for example, between approximately 6 inches and 48 inches, or between approximately 10 inches and 36 inches, or between approximately 16 inches and 30 inches. The attachment end 42 may be configured to be received by and/or attached to the handle attachment structure 22,24. In various embodiments of the invention, the handle 14 may comprise at least one notch 46 at one or both ends. The notch 46 may be sized and shaped to mate, couple, or engage with a portion of the handle attachment structure 22,24 and/or other accessories as described below. For example, the notch 46 may have a substantially curved shape to match an outer wall of a cylindrical tube or rod if the handle attachment structure 22,24 is cylindrical. Alternatively, if the handle attachment structure 22,24 has a substantially diamond-shaped cross-section, the notch 46 may have a substantially "V"-like shape.

In one embodiment of the invention, the handle 14 may attach at two separate points opposite each other on the primary tubular member 18 when the ends 34,36 are attached to form a loop, as in FIG. 6. In this manner, the loop formed by the primary tubular member 18 may receive added structural support from the handle 14. For example, the releasable fastener 26,28 may be a substantially hollow tubular connector having four openings such that any of the ends 34-40 may be inserted into opposite hollow openings of the releasable fastener 26,28. Furthermore, the handle 14 may slide up through two other opposing openings in the hollow tubular connector until the handle's notch 46 is received into a support connector 48 attached at another location along the primary tubular member 18. This provides the handle 14 with two points of engagement with the primary tubular member 18, further stabilizing the decoy 10 in breezy hunting situations as to minimize the allowance of unnatural motion.

Figures 16, 17:
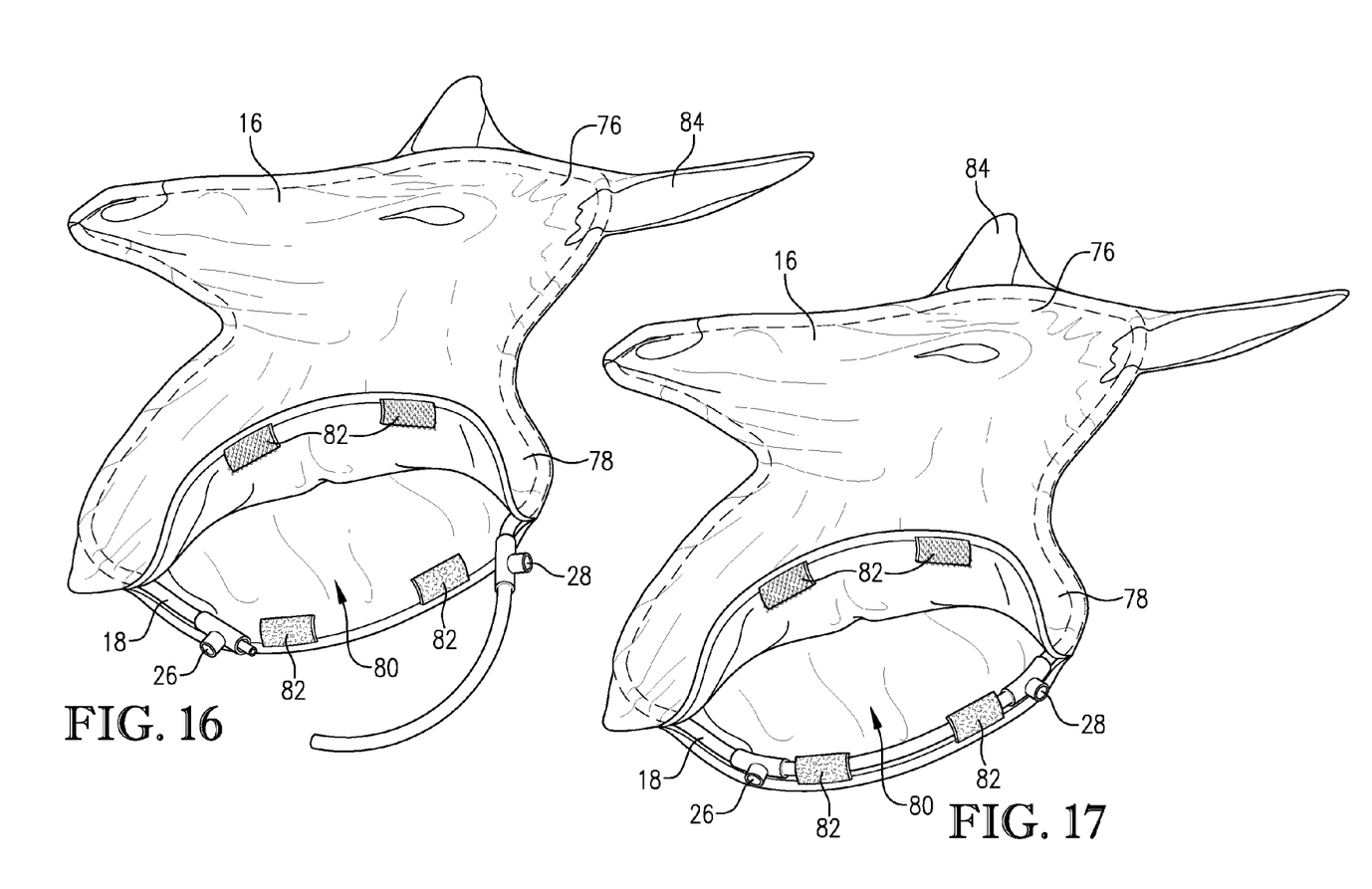
FIG. 16 is a perspective view of the cover of the decoy of FIG. 1 illustrating uncoupled ends of the internal support system and a frame opening of the cover in an open configuration.
FIG. 17 is a perspective view of the cover of the decoy of FIG. 1 illustrating coupled ends of the internal support system and the cover's frame opening in the open configuration.

The gripping end 44 of the handle 14 may be configured to be grasped by a hand 50 of a hunter (as illustrated in FIGS. 1 and 17). For example, the gripping end 44 may have a suitable thickness for gripping by the hand 50 and may be provided with various protrusions or materials to create an anti-slip surface. In some embodiments of the invention, the gripping end 44 may be integral with or attachable to a various accessories, such as a clamp 52 or a bow mount 54.

Figure 7:
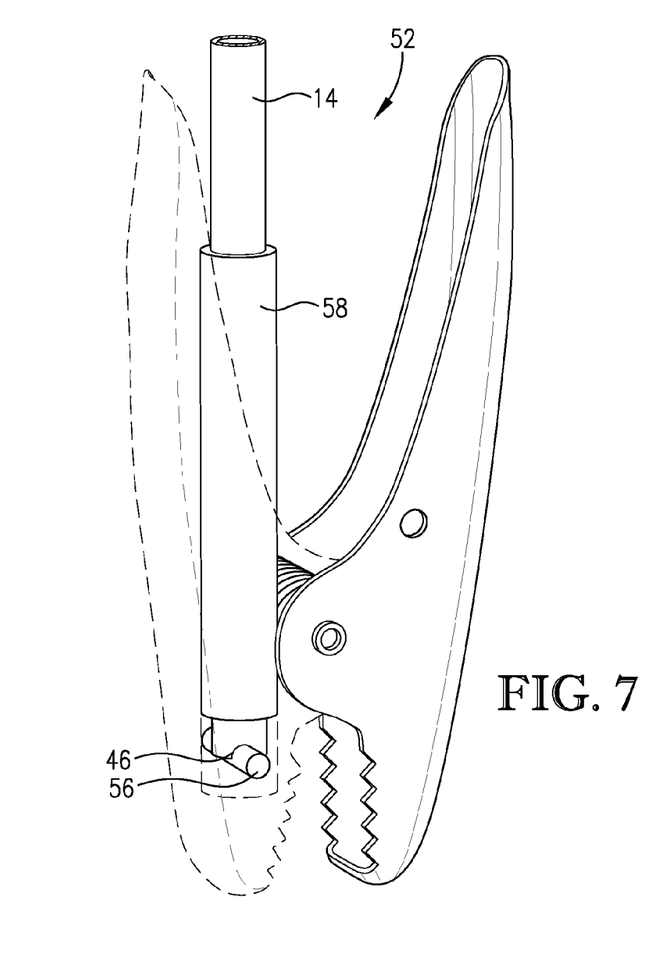
FIG. 7 is a perspective side view of a clamp configured for attachment with the decoy of FIG. 1 and another object.

The clamp 52, illustrated in FIG. 7, may be operable to mount or attach to a tree or other upright, free-standing objects. Specifically, the clamp 52 may be any kind of spring tension type clamp additionally comprising clamp attachment pin 56, such as a role pin or tension pin configured to engage with the at least one notch 46 of the handle 14 to keep the decoy from spinning or rotating relative to the clamp 52. Furthermore, the clamp 52 may comprise a guide tube 58 sufficiently large to allow the passage of the handle 14 therethrough. The guide tube 58 may be configured to guide the notch 46 to the attachment pin 56 and support the handle 14 therein.

Figure 8:
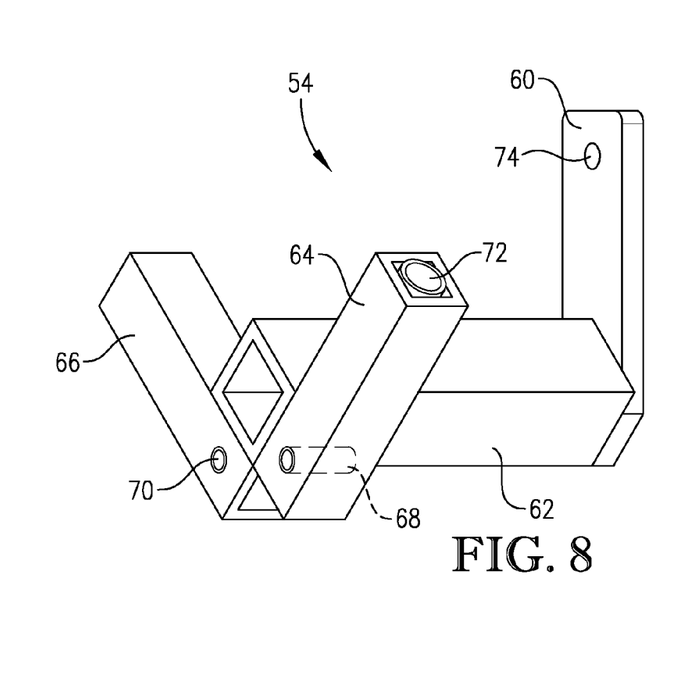
FIG. 8 is a perspective side view of a bow mount configured for attachment with the decoy of FIG. 1 and a bow, such as a hunting bow.
Figure 9:
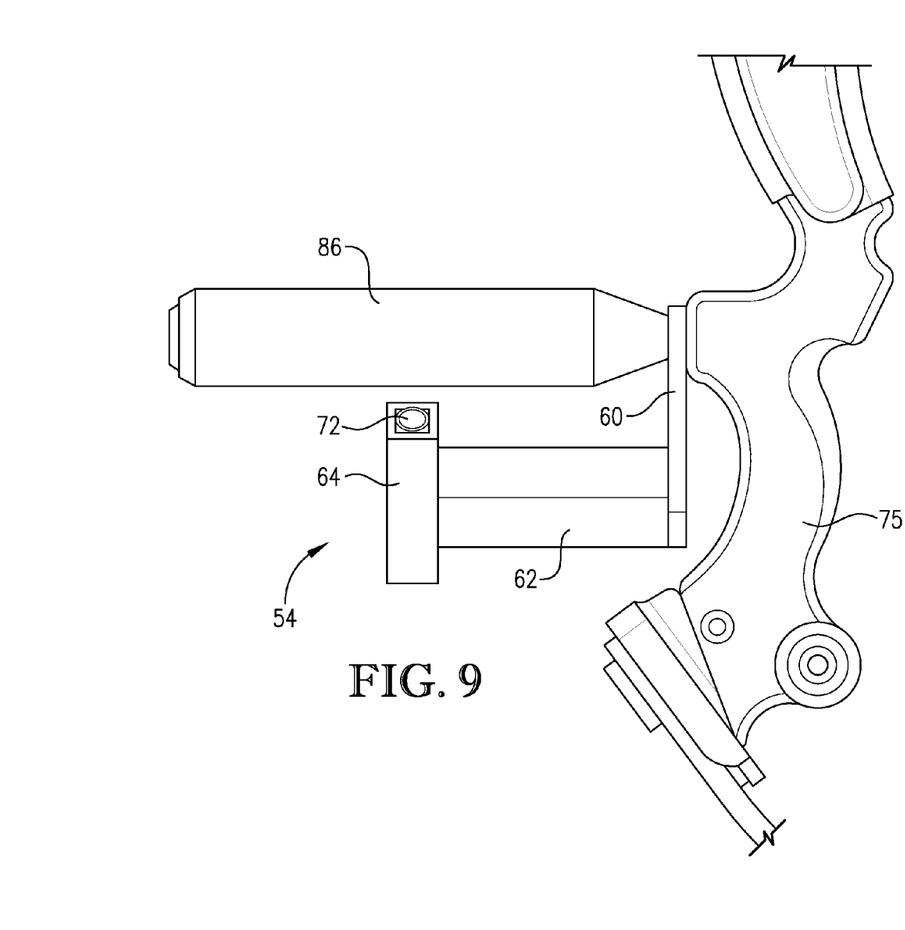
FIG. 9 is a perspective side view of the bow attached to the bow mount of FIG. 8.
Figure 10:
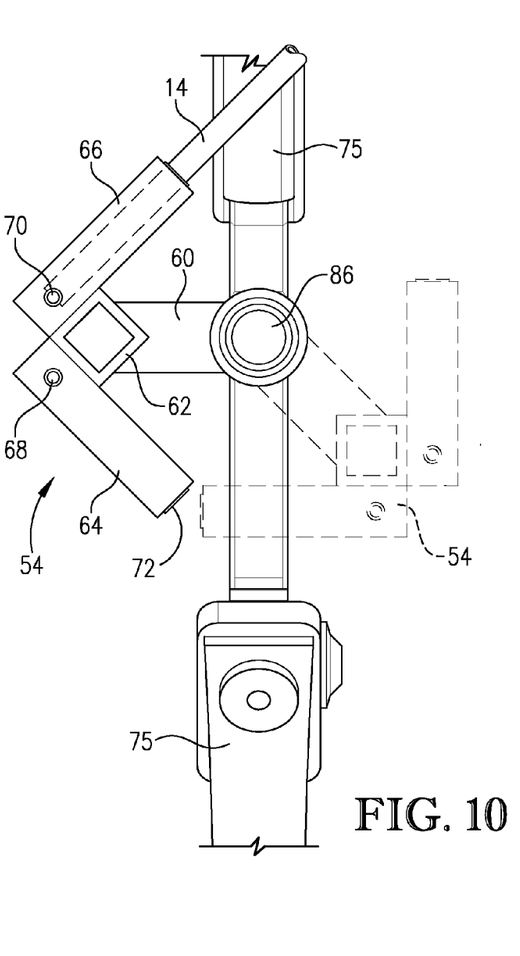
FIG. 10 is a perspective side view of the bow attached to the bow mount of FIG. 8 and the decoy's handle.

The bow mount 54, illustrated in FIGS. 8-10, may be configured to attach a bow 75 together with the decoy 10 such that a hunter does not need to hold the decoy 10 while using the bow to hunt, and may be formed of metal, plastic, or any other substantially rigid materials. In one embodiment of the invention, the bow mount 54 may comprise a flat portion 60, three hollow portions 62,64,66, two bow mount attachment pins 68,70, and lining tubes 72. The flat portion 60 may have one or more holes 74 drilled therein, sized to allow a stabilizer bolt 86 of the bow 75 to pass therethrough in a conventional manner, such that the bow 75 may be mounted to the flat portion 60.

The hollow portions 62-66 may be tubing pieces of any cross-sectional shape, such as square, and may comprise a first hollow portion 62, a second hollow portion 64, and a third hollow portion 66. The hollow portions 62-66 may be formed of metal, plastic, or any other substantially rigid materials and may be arranged substantially perpendicular to each other. An end of the first hollow portion 62 may be joined with the flat portion 60 and the first hollow portion 62 may be perpendicular to the flat portion 60.

Figure 11:
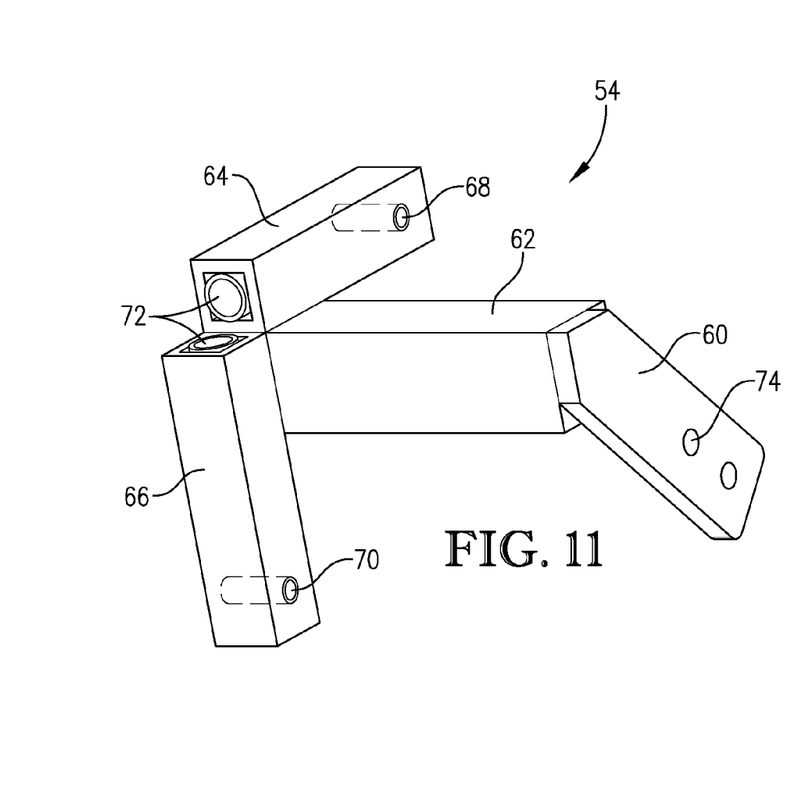
FIG. 11 is a perspective view of an alternative embodiment of the bow mount of FIG. 9 with bow mount attachment pins placed in alternative positions relative to the bow mount.
Figure 12:
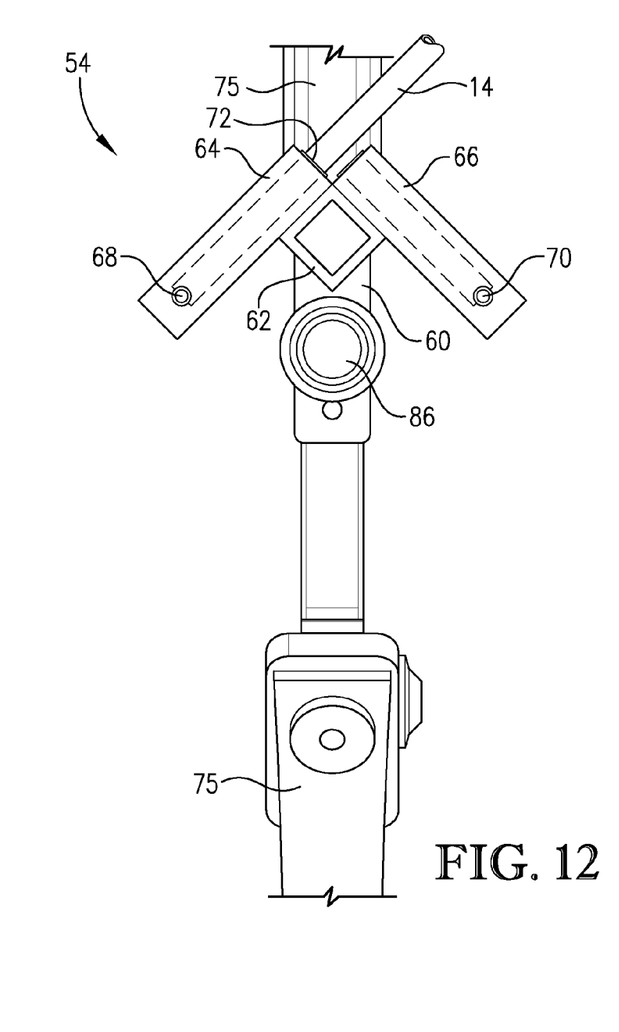
FIG. 12 is a perspective side view of the bow attached to the bow mount of FIG. 11.

The second and third hollow portions 64,66 may house lining tube 72, which may be substantially cylindrical and may be sized to allow the handle 14 to slide therethrough. The lining tube 72 may be secured by the bow mount attachment pins 68,70 to the bow mount 54 proximate to ends of the second and third hollow portions 64,66 where all three of the hollow portions 62-66 meet with each other. Alternatively, as illustrated in FIGS. 11 and 12, the bow mount attachment pins 68,70 may be secured to the bow mount 54 proximate to ends of the second and third hollow portions 64,66 distal from the ends where all three of the hollow portions 62-66 meet. In this alternative configuration, the handle 14 may slide into one of the second and third hollow portions 64,66 at the end where all three of the hollow portions 62-66 meet. In some embodiments of the invention, the bow mount attachment pins 68,70 may be selectively attachable proximate either end of the hollow portions 64,66 to accommodate the handle 14 sliding into the hollow portions 64,66 at either end thereof.

The bow mount attachment pins 68,70 may be sized and shaped to couple or engage with the notch 46 of the handle 14. Thus, the handle 14 may be selectively attached to the bow mount 54 via the second hollow portion 64 or the third hollow portion 66 to provide a variety of configurations of the decoy 10 relative to the bow 75. Additionally or alternatively, the bow mount 54 may be pivotally or rotatably adjustable relative to the bow 75 via the stabilizer bolt 86. For example, a right-angle between the second and third hollow portions 64,66 may face in an upward direction or a downward direction.

The cover 16, as illustrated in FIGS. 13-20 may be a pocket formed of any cloth or drapeable material and may comprise a head portion 76, a neck portion 78, and a frame opening 80 which may be formed through the neck portion 78. To maintain a small, portable size of the decoy 10, the cover 16 preferably does not depict legs or a torso of the animal. The head portion 76 may be shaped and sized like a head of a large game animal and the neck portion 78 may be shaped and sized like a neck and/or a shoulder of the large game animal. The frame opening 80 may be sized and shaped to receive and allow removal of the internal support system 12. Furthermore, the frame opening 80 my be selectively opened and closed by cover fasteners 82, such as buttons, ties, snaps, clasps, VELCRO, or any other fasteners. In one embodiment of the invention, the cover 16 may be made from two pieces of material sewn together around a periphery edge of each piece of material, except at a base edge where the frame opening 80 is located.

Figures 13, 14, 15:
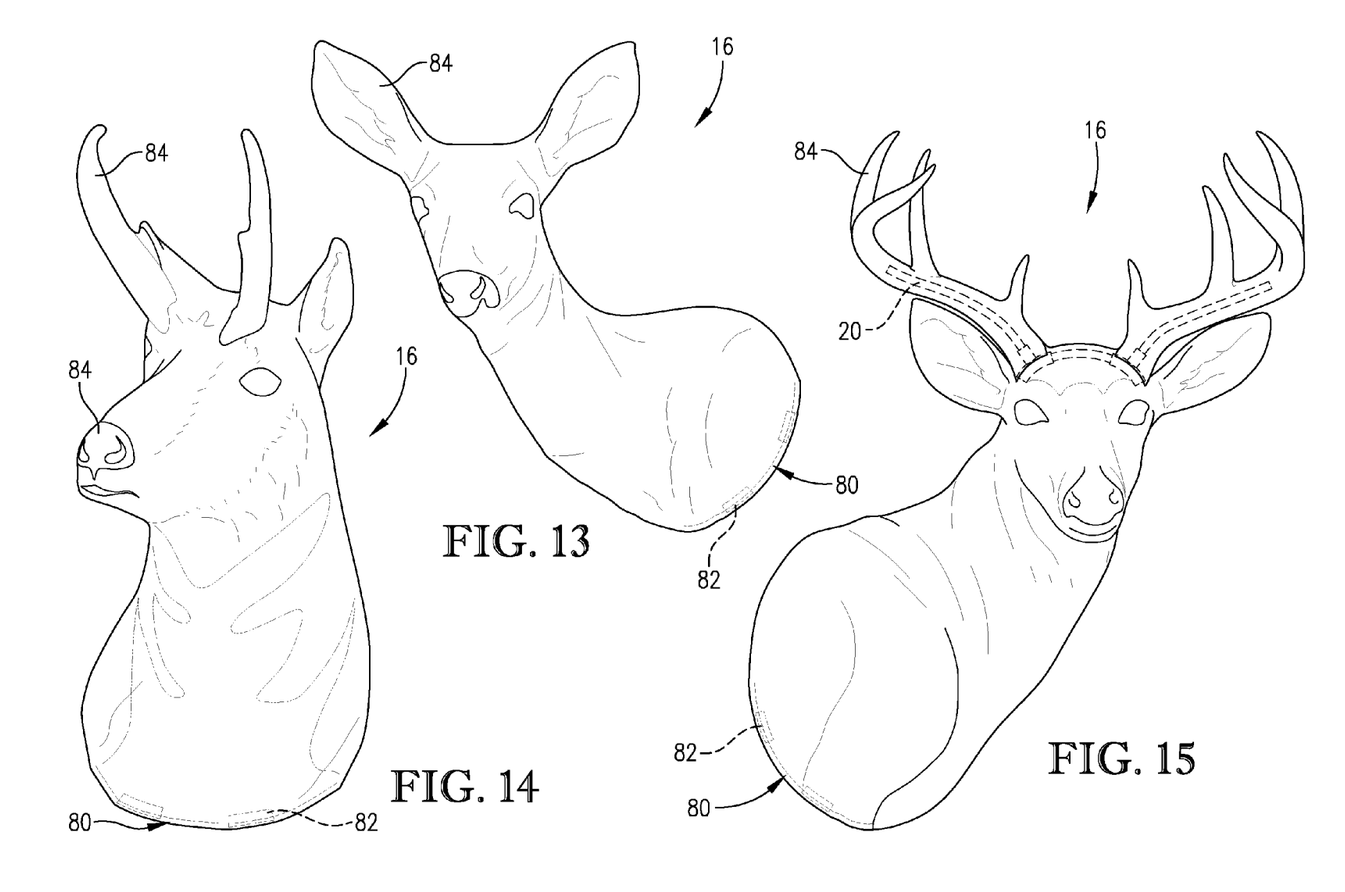
FIG. 13 is a perspective view of a cover of an embodiment of the decoy without external antlers.
FIG. 14 is a perspective view of the cover of an embodiment of the decoy having external antlers.
FIG. 15 is a perspective view of the cover of an embodiment of the decoy with internally-supported antlers.

The cover 16 may have the likeness of any large game animal printed or painted thereon, excluding legs, hind quarters, a tail, and/or a torso of the animal. For example, the cover 16 may be made of a cloth substrate that is capable of absorbing die or ink from a digital printer. Furthermore, the cover 16 may comprise protruding features 84, such as ear-shaped or nose-shaped pockets into which feature support members 20 may be inserted. Additionally or alternatively, the protruding features 84 may be features external of the cover 16, such as antlers, which may be selectively and detachably attached to the cover 16, as illustrated in FIG. 14. In some embodiments of the invention, the cover 16 may comprise loops or channels (not shown) sewn therein through which portions of the internal support system 12 may slide into such that the internal support system 12 does not shift within the cover 16 when in the assembled configuration, as described below.

Figures 18, 19:
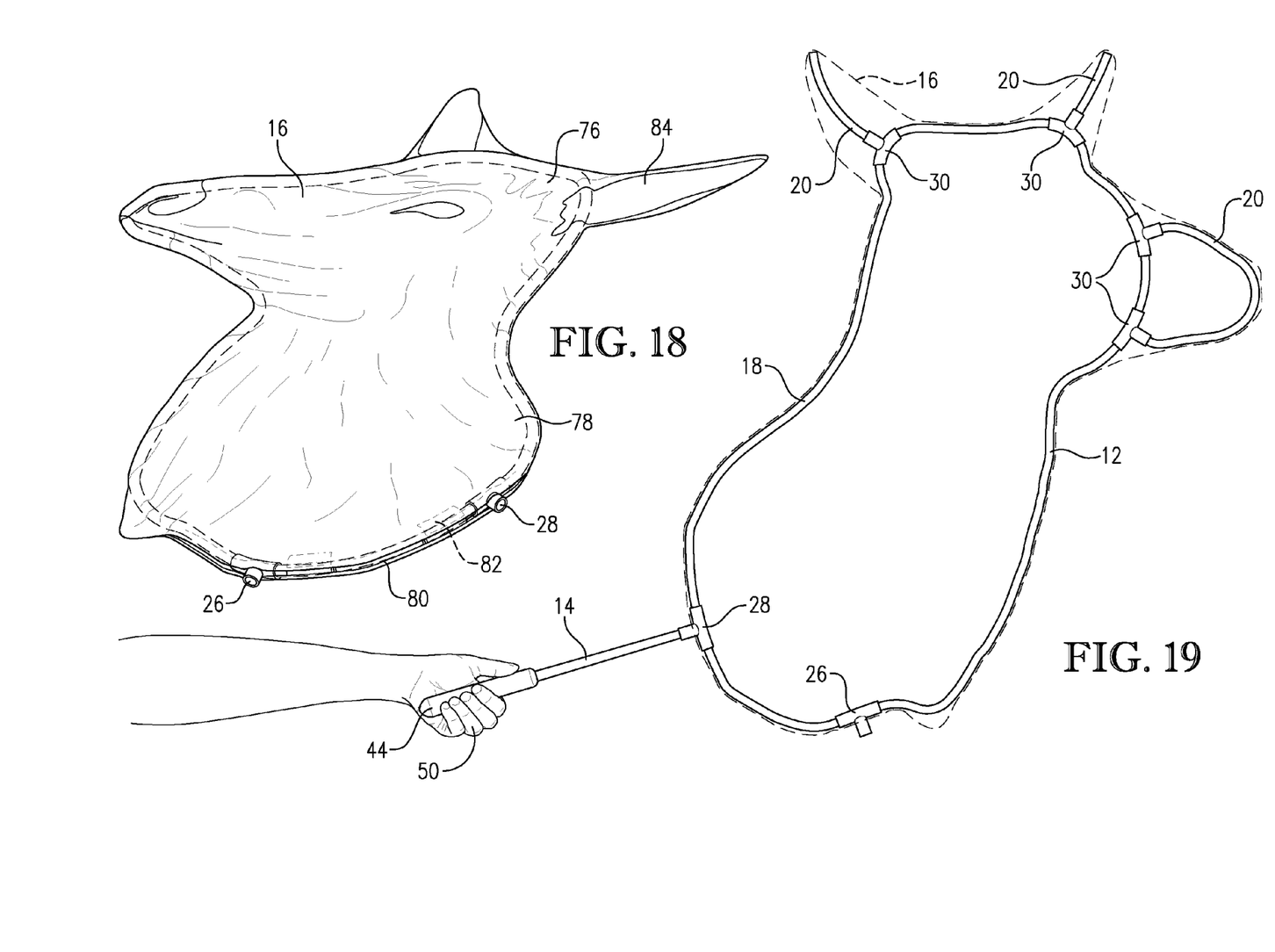
FIG. 18 is a perspective view of the cover of FIG. 17 with the frame opening in a closed configuration.
FIG. 19 is a perspective view of the decoy of FIG. 1 in the assembled configuration, with the cover illustrated in phantom.
Figures 20, 21:
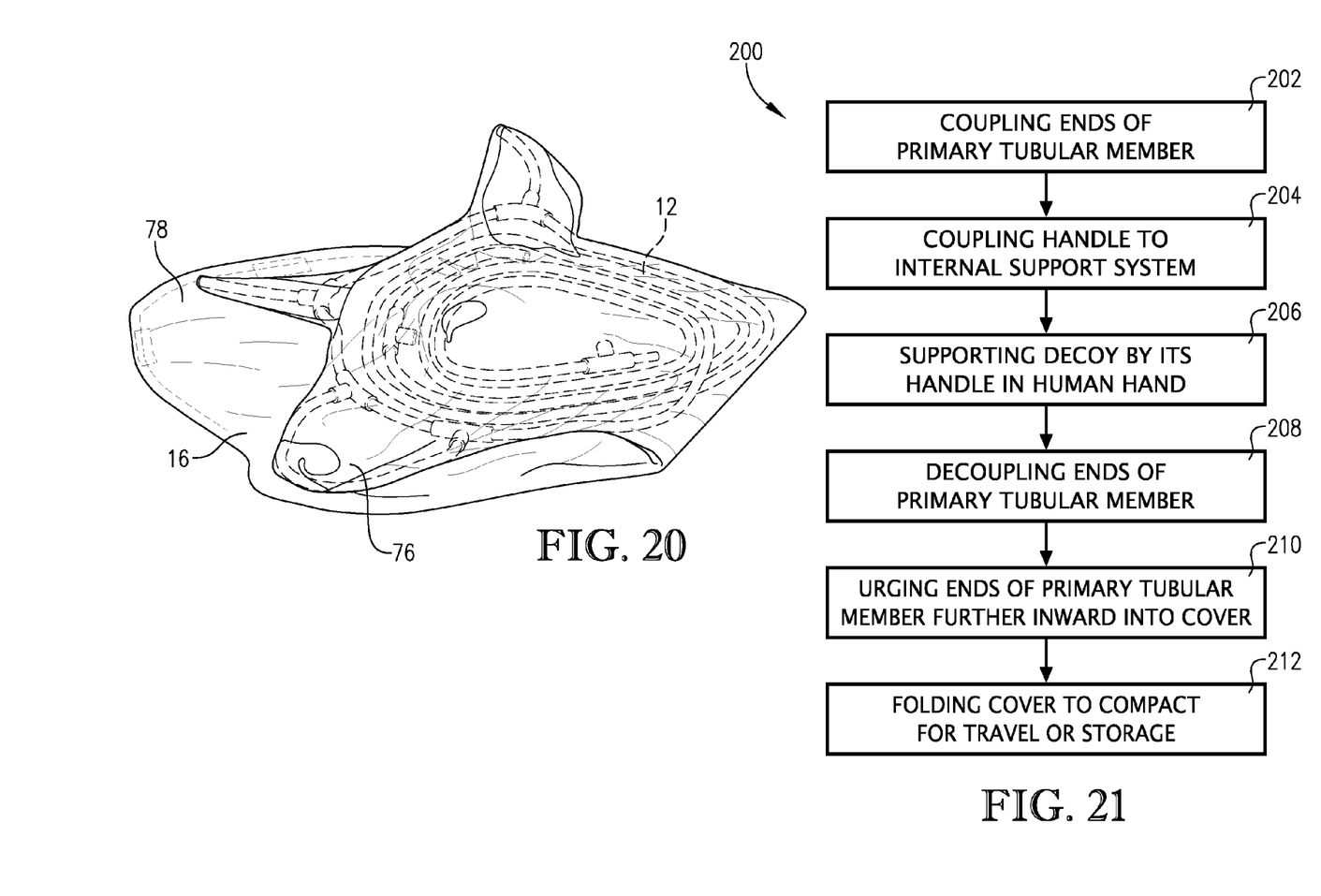
FIG. 20 is a perspective view of the decoy of FIG. 1 in the disassembled configuration, with the cover illustrated in phantoms.
FIG. 21 is a flow chart of a method of using the decoy of FIG. 1.

As mentioned above, the decoy 10 may have an assembled configuration, as illustrated in FIG. 19, and a disassembled configuration, as illustrated in FIG. 20. The maximum thickness of the decoy 10 in the assembled configuration may be less than 8 inches, less than 6 inches, or less than 4 inches. In the assembled configuration, the primary tubular member 18 may be formed into a single loop with ends 34,36 (and/or spacer tube ends 38,40) being coupled to one another, such as by the releasable fastener 26,28. In the assembled configuration, the handle 14 may extend at least 6 inches, at least 10 inches, or at least 16 inches external to the cover 16. Furthermore, in the assembled configuration, the internal support system 12 may be received in the cover 16 and may support the cover 16 generally in the shape of the large game animal being depicted.

In the assembled configuration, the handle 14 may be coupled to the internal support system 12 and may extend external to the cover 16. As described above, the handle 14 may be inserted at one of several attachment structures 22,24, providing for several different orientations of the handle 14 relative to the internal support system 12. Furthermore, in the assembled configuration, the fasteners 48 may be connected to close the frame opening 80 of the cover 16 and any protruding features 84 may be attached to the decoy 10. In some embodiments of the invention, the decoy 10 may be attached to another object via the clamp 52 or the bow mount 54 in the assembled configuration.

In the disassembled configuration, the ends 34,36 (and/or spacer tube ends 38,40) may be decoupled from one another and/or from the releasable fastener 26,28 such that the primary tubular member 18 (and/or the spacer tube 32) is not formed into the single loop. Furthermore, in the disassembled configuration, the handle 14 may be decoupled from the internal support system 12. In some embodiments of the invention, the cover 16 may be removed completely off of the internal support system 12, allowing the cover 16 to be washed.

In other various embodiments of the invention in the disassembled configuration, the decoupled ends 34,36 may each be urged inward into and/or toward the head portion 76 of the cover 16, such that at least some of the neck portion 78 and/or at least some of the head portion 76 does not contain any of the internal support system 12 and may therefore be folded, rolled up, or otherwise compacted for transport or storage. For example, if the decoupled ends 34,36 are urged into and the primary tubular member 18 is coiled into the head portion 76, the neck portion 78 may be folded against the head portion 76, as illustrated in FIG. 20. In the disassembled configuration, with the decoupled primary tubular member 18 coiled within the cover 16, the maximum dimension of the internal support structure 12 may be reduced to less than approximately 75%, less than approximately 60%, or less than approximately 50% of the maximum dimension of the internal support structure 12 when it is in the assembled configuration. In some embodiments of the invention, the cover 16 may be folded in half in the disassembled configuration to hold the primary tubular member 18 in a coiled position.

In one embodiment of the invention, illustrated in FIG. 21, a method 200 of using the decoy 10 may comprise unfolding or otherwise expanding the cover 16 and coupling opposite ends of the primary tubular member 18 into a loop residing inside of the cover 16, as depicted in step 202. For example, when the cover 16 is unfolded, the ends 34,36 may be pulled into the neck portion 78 and coupled with each other such that the primary tubular member 18 provides structural support to both the head and neck portions 76,78 of the cover 16.

As depicted in step 204, the method 200 may also comprise coupling the handle 14 to the internal support system so that the handle extends external to the cover. For example, the handle 14 may be coupled to the handle attachment structure 22,24 and then the fasteners 82 may be fastened together, closing the frame opening 80.

As depicted in step 206, the method 200 may further comprise supporting the decoy 10 solely by holding the handle 14 with a human hand. For example, a hunter may hide behind a visual obstacle, such as a bush, and may hold the handle 14 such that only the cover 16 is visible by the large gaming animal. Furthermore, the hunter may manually move the decoy 10 to simulate natural movement of the large game animal depicted by the decoy 10. Alternatively, instead of supporting the decoy 10 by holding the handle 14 with the human hand 50, the method 200 may comprise supporting the decoy 10 by mounting the handle 14 to another object using the clamp 52 or the bow mount 54.

As depicted in step 208, the method 200 may further comprise decoupling the opposite ends 34,36 of the primary tubular member 18, such as by pulling the two ends 34,36 (and/or the spacer tube ends 38,40) away from each other. Next, the ends 34,36 (and/or the spacer tube ends 38,40) may be urged further inward into the cover, as depicted in step 210 and described above.

Finally, the method 200 may comprise folding a first portion of the cover 16 together with a second portion of the cover 16, as in step 212. For example, the first portion of the cover 16 may be the neck portion 78 and the second portion of the cover 16 may be the head portion 76, as described above. Folding the cover 16 may comprise any of folding, rolling, or crumpling the cover 16 to compact or otherwise reconfigure the decoy 10.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A partial-body large game decoy that is shiftable between a disassembled configuration and an assembled configuration, said decoy comprising:
   (a) an internal support system comprising a flexible elongated primary tubular member having first and second substantially opposite ends, one or more feature support members coupled to and extending outwardly from the primary tubular member, a handle attachment structure coupled to the tubular member, a releasable fastener, and, optionally, a spacer tube configured for connection between the first and second ends of the primary tubular member, wherein the releasable fastener is either (i) integral with the first end of the primary tubular member and defines an opening substantially opposite an end of the releasable fastener that is integral with the first end of the primary tubular member, the opening configured to receive either the second end of the primary tubular member or an end of the spacer tube, or (ii) separate from the opposite ends of the primary tubular member and defines first and second substantially opposite-facing openings, the first of the substantially opposite-facing openings configured to receive the first end of the primary tubular member, the second of the substantially opposite-facing openings configured to receive either the second end of the primary tubular member or an end of the spacer tube;
   (b) an elongated handle having an attachment end and a gripping end, wherein the attachment end is configured for selective attachment to the handle attachment structure of the internal support system; and
   (c) a cover having the partial likeness of a large game animal therein or thereon, wherein the decoy depicts the head and neck of a large game animal separate from and absent of the torso and legs of the large game animal, wherein:
      when the decoy is in the assembled configuration—
         (i) the primary tubular member forms at least a portion of a single loop with the substantially opposite ends of the primary tubular member being coupled to one another via at least the releasable fastener and, optionally, the spacer tube,
         (ii) the internal support system is received in the cover and supports the cover generally in the shape of the large game animal being depicted, and
         (iii) the handle is coupled to the internal support system and extends external to the cover, and
      when the decoy is in the disassembled configuration—
         (i) the ends of the primary tubular member are decoupled from one another and the primary tubular member is not formed into a single loop, and
         (ii) the handle is decoupled from the internal support system.

2. The decoy of claim 1, wherein, when the decoy is in the disassembled configuration, the internal support system is removed from within the cover.

3. The decoy of claim 1, wherein the handle extends at least 6 inches external to the cover when the decoy is in the assembled configuration.

4. The decoy of claim 1, wherein the maximum dimension of the internal support structure when in the disassembled configuration is less than 75% of the maximum dimension of the internal support structure when in the assembled configuration.

5. The decoy of claim 1, wherein the maximum thickness of the decoy when in the assembled configuration is less than 8 inches.

6. The decoy of claim 1, wherein the length of the primary tubular member is between 18 inches and 120 inches.

7. The decoy of claim 1, wherein the length of the handle is between 6 inches and 48 inches.

8. The decoy of claim 1, wherein the cover includes protruding features of a large game animal, wherein when the decoy is in the assembled configuration the feature support members of the internal support structure are received in and support the protruding features of the cover.

9. The decoy of claim 1, wherein the cover comprises a cloth with the likeness of a large game animal printed or painted thereon.

10. The decoy of claim 1, wherein the gripping end of the handle comprises a clamp or a bow mount configured for attaching the decoy to another object.

11. The decoy of claim 1, wherein the internal support system further comprises a plurality of spaced apart discrete feature support members coupled to and extending outwardly from the primary tubular member, wherein when the decoy is in the assembled configuration the handle extends outwardly from the internal support system in a direction substantially opposite the feature support members.

12. The decoy of claim 11, wherein the internal support system further comprises a plurality of discrete spaced apart T-shaped connectors, each coupling one of the feature support members to the primary tubular member.

13. The decoy of claim 1, wherein the internal support system comprises the spacer tube and the releasable fastener member is configured to releasably couple the first end of the primary tubular member to a first end of the spacer tube.

14. The decoy of claim 13, wherein the internal support system further comprises an additional releasable fastener configured to couple the second end of the primary tubular member to a second end of the spacer tube.

15. A partial-body large game decoy that is shiftable between a disassembled configuration and an assembled configuration, said decoy comprising:
   (a) an internal support system comprising a flexible elongated primary tubular member, a plurality of spaced apart discrete feature support members coupled to and extending outwardly from the primary tubular member, a handle attachment structure coupled to the tubular member, a releasable fastener, and, optionally, a spacer tube configured for connection between substantially opposite ends of the primary tubular member;
   (b) an elongated handle having an attachment end and a gripping end, wherein the attachment end is configured for selective attachment to the handle attachment structure of the internal support system; and (c) a cover comprising a cloth with the likeness of a large game animal printed or painted thereon including a head portion and a neck portion, wherein the cover depicts the head and neck of the large game animal separate from and absent of the torso and legs of the large game animal, wherein:

when the decoy is in the assembled configuration
   (i) the primary tubular member forms at least a portion of a single loop with the opposite ends of the primary tubular member being coupled to one another via at least the releasable fastener and, optionally, the spacer tube,
   (ii) the internal support system is received in the cover and supports the cover generally in the shape of the large game animal being depicted,
   (iii) the handle is coupled to the internal support system and extends external to the cover, and
   (iv) the handle extends outwardly from the internal support system in a direction substantially opposite the feature support members, and when the decoy is in the disassembled configuration
   (i) the ends of the primary tubular member are decoupled from one another and the primary tubular member is not formed into a single loop, and
   (ii) the handle is decoupled from the internal support system.

16. The decoy of claim 15, wherein the cover includes protruding features of a large game animal, wherein when the decoy is in the assembled configuration the feature support members of the internal support structure are received in and support the protruding features of the cover.

17. The decoy of claim 15, wherein the gripping end of the handle comprises a clamp configured for attaching the decoy to a tree and/or a bow mount configured for attaching the decoy to a bow.

18. The decoy of claim 15, wherein, in the disassembled configuration, the ends of the primary tubular member are not attached to each other and the primary tubular member rests in a coiled configuration within the head portion such that the neck portion of the cover not containing the primary tubular member is foldable onto the head portion of the cover containing the primary tubular member.

19. The decoy of claim 15, wherein the handle attachment structure comprises a first attachment structure and a second attachment structure coupled to the tubular member a distance apart from each other, wherein each of the first and second attachment structures are configured for selectively receiving the attachment end of the handle.

20. The decoy of claim 15, wherein when the internal support system does not comprise the spacer tube, and the releasable fastener is configured to releasably couple the opposite ends of the primary tubular member to one another, wherein when the internal support system comprises the spacer tube, the releasable fastener is configured to releasably couple one of the opposite ends of the primary tubular member to the spacer tube.

21. The decoy of claim 15, wherein the internal support system further comprises a plurality of discrete spaced apart T-shaped connectors, each coupling one of the feature support members to the primary tubular member.

* * * * *